United States Patent Office 3,446,299
Patented May 27, 1969

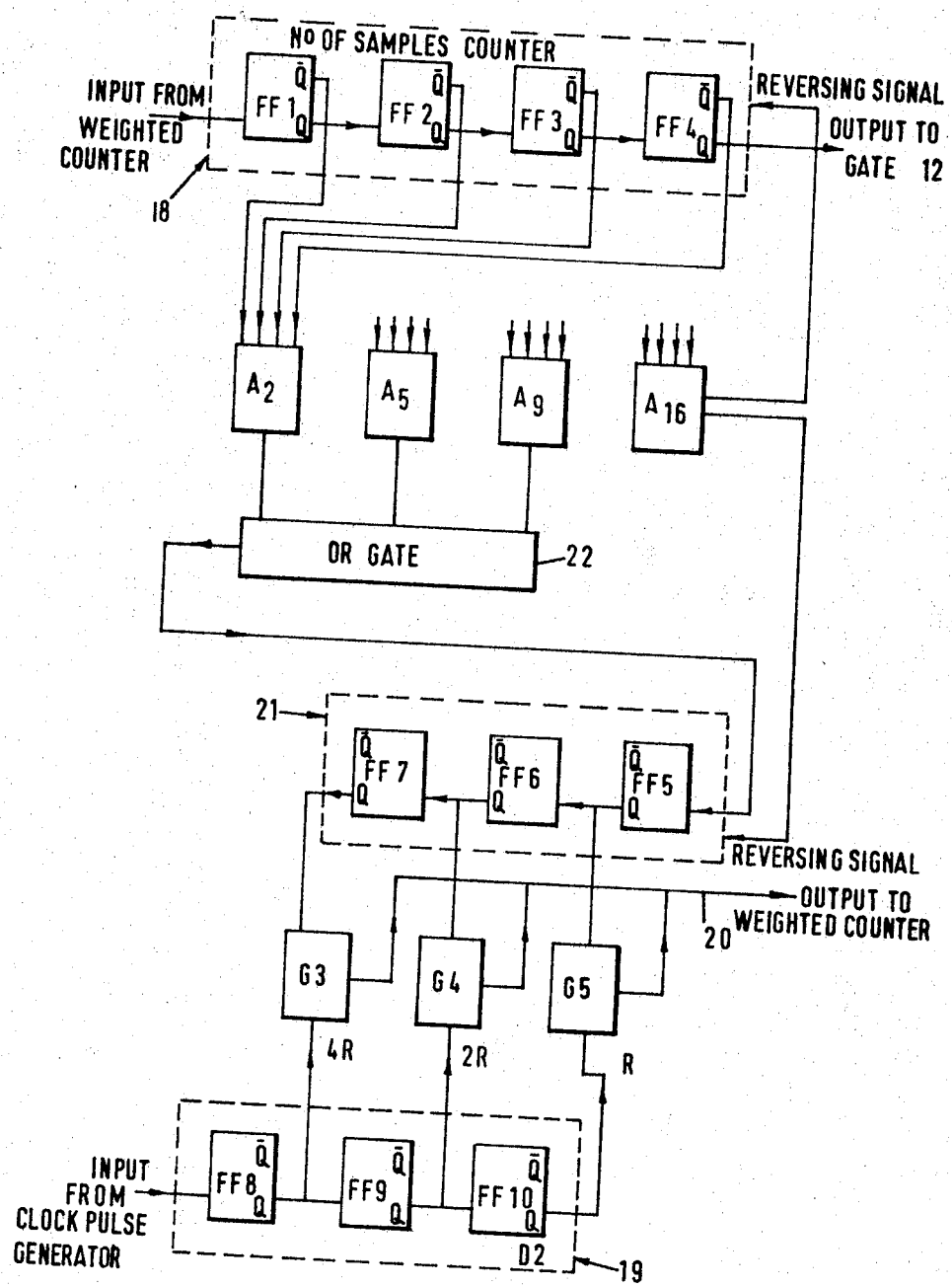

3,446,299
DYNAMIC WEIGHING
Jan Leonowicz, Kingswinford, England, assignor to W. & T. Avery Limited, Birmingham, England, a British company
Filed Feb. 28, 1966, Ser. No. 530,441
Claims priority, application Great Britain, Mar. 3, 1965, 9,000/65
Int. Cl. G01g *19/04*
U.S. Cl. 177—25      13 Claims

ABSTRACT OF THE DISCLOSURE

An apparatus for dynamic weighing wherein the product of a load-sensing, transducer output signal, which is representative of the true static weight of the moving load plus a time-varying analogue error signal, and a predetermined function is integrated with respect to time over the weighing period, and wherein the integrated result is divided by the integral of the aforesaid function to provide a readout representative of the true static weight of the load. The predetermined function is one of time, is single-valued, is positive throughout the weighing period, and is substantially symmetrical about a maximum value equal to one-half the weighing period.

---

Figure 1:
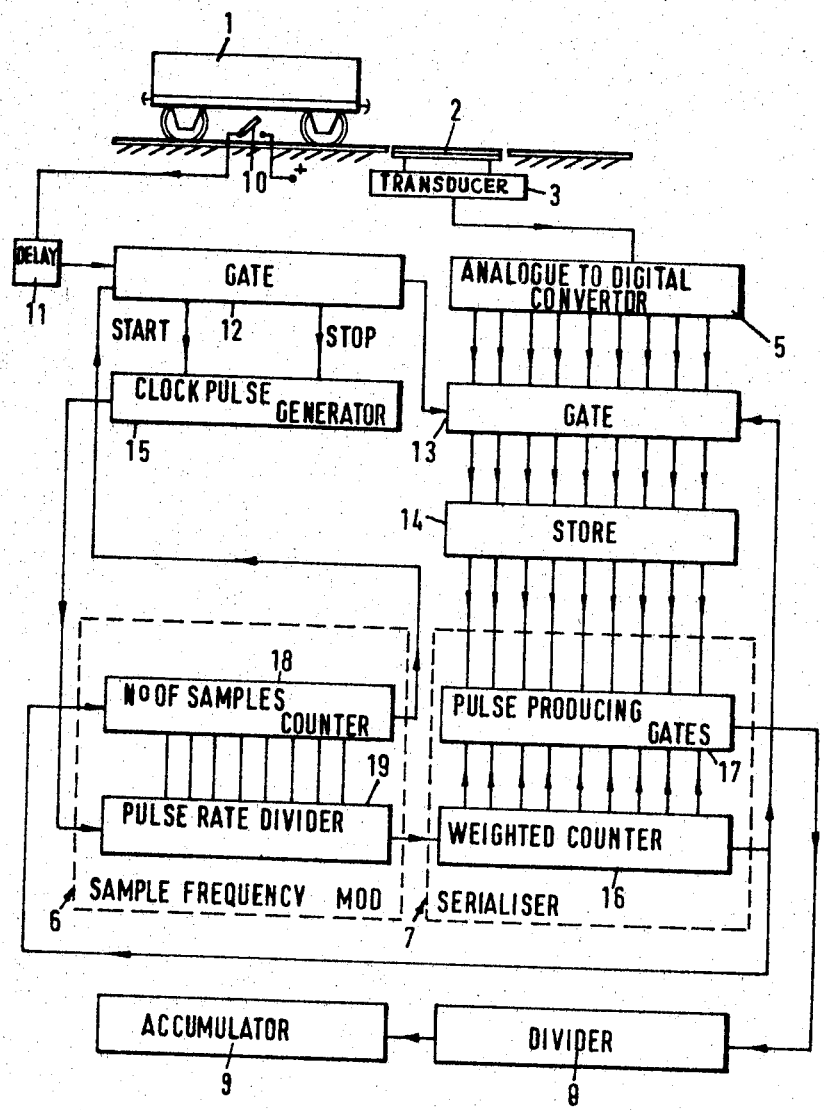

This invention relates to a method and apparatus for dynamic weighing of loads such as, for example, weighing railway rolling stock in motion over load sensing transducers providing electrical output.

In dynamic weighing the electrical signal derived from load-sensing transducers consists of a signal of constant amplitude representative of the true static weight of the load plus a time-varying signal caused by mechanical vibrations of the load. The time-varying signal can be represented by several sinusoidal signals of different frequencies with random amplitude and phase.

Considering the effect of one such sinusoidal noise signal, the mean value of the dynamic load measured over a period of time T seconds can be expressed mathematically as $$W \pm \frac{1}{T}\int_0^T E \sin(2\pi ft + \theta)dt \quad (1)$$

where:

$W$ is the static value of the load,
$f$ is the frequency of the sinusoidal signal,
$E$ is the peak value of the sinusoidal signal, and
$\theta$ is the phase angle of the sinusoidal signal.

The above expression reduces to $$W \pm \frac{E}{\pi fT}\sin(\pi fT + \theta)\sin \pi fT \quad (2)$$

Thus the mean value of the dynamic load over a period of time T does not, in general, correspond to the true static value of the load, and the error is given by the latter part of expression 2, i.e.

$$\pm \frac{E}{\pi fT}\sin(\pi fT + \theta)\sin \pi fT \quad (3)$$

This error tends to a maximum when $$\theta = \frac{\pi}{2}(1 - 2\pi fT) \quad (4)$$

and $$\pi fT = \frac{\pi}{2}(2n-1) \quad (5)$$

where $n$ is a positive integer.

Under the conditions given by expressions 4 and 5, expression 3 reduces to $$\pm \frac{E}{\pi fT} \quad (6)$$

and with, for example, $T=1$ second and $f=2\frac{1}{2}$ cycles per second expression 6 equals $$\frac{E}{7.85} \quad (7)$$

Such errors as those discussed above are very often incompatible with the desired accuracy of dynamic weighing systems and the invention has for its principal object to provide a method and apparatus for dynamic weighing in a short period of time which is capable of significantly reducing the errors which result from the time-varying components present in the output signal from the load-sensing transducers.

In its broadest aspect the invention consists of a method of dynamic weighing comprising electrically representing combined true static weight and time varying components of a dynamic weighing, multiplying the electrical representation by a function $y=f(t)$, which function is single-valued, positive throughout the weighing period T, and is substantially symmetrical about a maximum value at T/2, integrating the product signal with respect to time over the weighing period T, and dividing the result of the integration by the integral of the function $f(t)$ over the same period of time T.

In one example of the aforesaid method the function is of the form $$y = A - B \cos Kt \quad (8)$$

where A, B and K are constants and $t$ is time.

According to another form of the aforesaid method the function is of the form $$-K(t-b)^2 y = e \quad (9)$$

where K and $b$ are constants and $t$ is time.

In a still further example the function is of the form $$y = A + \frac{B \sin K(t-b)}{K(t-b)} \quad (10)$$

where A, B, K and $b$ are constants and $t$ is time.

The invention further includes apparatus for dynamic weighing comprising at least one load-sensing transducer for providing an electrical output indicative of a load applied dynamically to the transducer; and an electrical circuit means for multiplying the electrical output from the transducer by the function $y=f(t)$ which function is single-valued, positive throughout the weighing period T, and is substantially symmetrical about a maximum value at T/2, integrating the product signal with respect to time over the weighing period T, and dividing the result of the integration by the integral of the function $f(t)$ over the same period of time T.

In one embodiment of the inventioin the composite transducer output signal is multiplied by the function $$1 + a - a \cos 2\pi \frac{t}{T} \quad (11)$$

which is a more specific form of expression 8. The value of the constant $a$, which defines the amplitude of the function $f(t)$, is selected according to the unwanted frequencies present in the composite transducer output signal. This can be expressed mathematically as:

$$W \pm \frac{\int_0^T E \sin(2\pi ft + \theta)\left(1 + a - a\cos 2\pi \frac{t}{T}\right)dt}{\int_0^T \left(1 + a - a\cos 2\pi \frac{t}{T}\right)dt} \quad (12)$$

In the worse case, as given by expressions 4 and 5 and where $a$ is given the value 7 and $T=1$ second, the above expression reduces to $$W \pm \frac{E(8-f^2)}{8\pi f(f^2-1)} \qquad (13)$$

which with a value of 2½ cycles per second for $f$ gives an error of $$\frac{E}{188} \qquad (14)$$

The significant reduction in the errors caused by the time-varying signals present in the output signal from the load-sensing transducers can be seen from a comparison of expressions 7 and 14.

Figure 2:
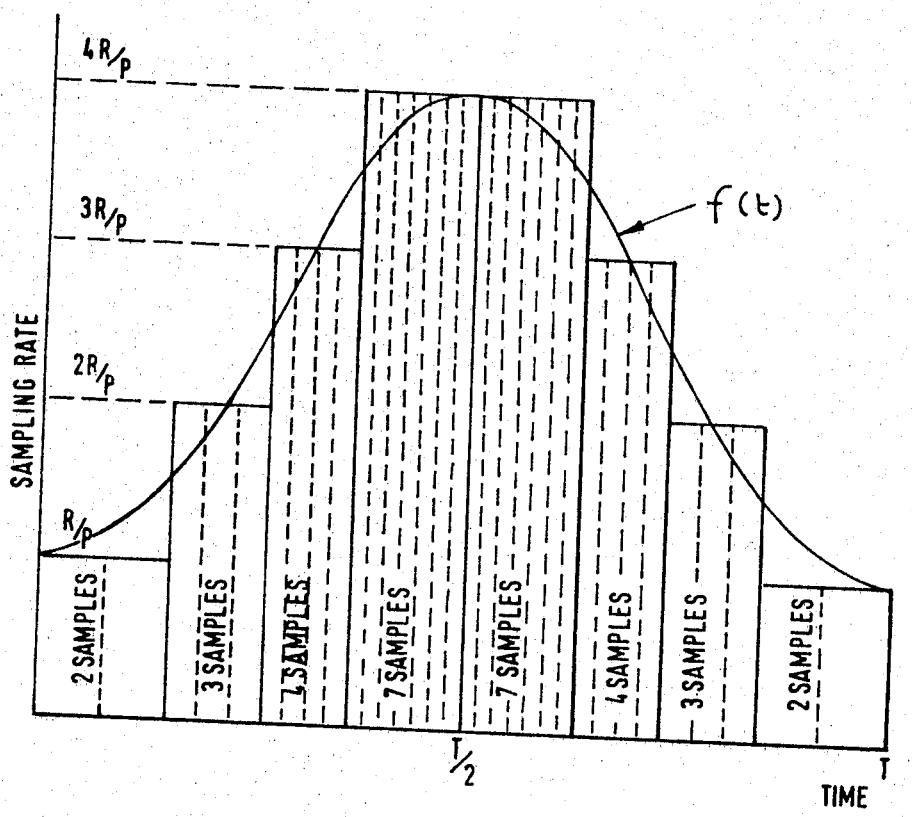

One embodiment of the invention intended for use with signals of digital form is illustrated in the accompanying drawings wherein FIG. 1 is a block schematic drawing of a complete dynamic weighing system for weighing railway rolling stock, FIG. 2 is a graph illustrating the function of the sample frequency modulator of FIG. 1 and FIG. 3 is a block schematic drawing of the sample frequency modulator.

The general operation of the system of FIGURE 1 is as follows. The rolling stock 1 passes over a railway track section 2 mounted on load sensing transducers 3, for example load cells, to produce an electrical analogue signal of constant amplitude representative of the true static weight of the load plus a time-varying analogue error signal. These combined signals are converted into a parallel digital signal by a conventional analogue-to-digital converter 5. The resultant digital signal is sampled N times during the weighing period T, whilst the sampling rate is varied by a sample frequency modulator 6 according to a predetermined function $f(t)$ of the general type discussed above. The sum of all of the given N samples is represented by a serialiser 7 whose output is divided in a divider 8 by the total number of samples N, and the result which represents the true static weight of the load, is registered in the form of a parallel digital signal in a conventional accumulator 9.

More specifically the operation of the circuit is as follows:

The signal to start the weighing cycle is provided from a switch 10 responsive to a wagon 1 approaching the rail section 2 and is fed via a delay 11 to gate 12. The output from this gate 12 performs two functions: first it opens a gate 13 for a short period of time which enables the instantaneous parallel digital signal on the analogue-to-digital converter 5 to be transferred to a store 14 where it is frozen for the duration of one sample; and secondly it starts running a clock pulse generator 15. The store 14 is of convention design comprising a number of bi-stable elements, the precise number depending upon the weighing capacity of the system.

The output pulses from the clock pulse generator 15 are fed via the sampling frequency modulator 6 into the serialiser 7, which consists of a weighted counter 16 and a number of pulse producing gates 17, as shown. For one sample it is necessary to feed sufficient pulses into the weighted counter 16 to produce a carry pulse at its output. The required number of pulses (P) is the same for every sample and depends on the weighing capacity of the system. The feeding of pulses into the weighted counter 16 causes the pulse producing gates 17 to feed pulses into the divider 8. The number of pulses fed into divider 8 during one sample corresponds to the weight registered in the store for that particular sample. Thus, as its name implies, the serialiser 7 serialises the parallel digital signal in the store. A more detailed description of the serialiser is given in "A New Method for Performing Digital Arithmetic," Electronic Eng. vol. 35, No. 428, October 1963, pp. 670–675.

The carry pulse from the weighted counter 16, which signifies the end of one sample, is fed into a number of samples counter 18 forming part of the modulator 6 and serving to progressively register the number of samples taken, and also into gate 13. This signal opens gate 13 and a new instantaneous load signal is transferred from the convertor 5 into the store 14. The sampling frequency modulator 6 continues to feed pulses into the weighted counter 16 until a second carry pulse appears at the output of the latter to signify the completion of the second sample. This process is repeated until a predetermined number of samples N has been taken. At this point a signal is obtained from the number of samples counter 18 which is fed into gate 12 and stops the clock pulse generator 15 so that the weighing cycle is now completed. The divider 8, which is of conventional design comprising a number of bi-stable elements, has a dividing factor equal to the given number of samples N, so that at the end of the weighing cycle the accumulator 9 registers a parallel digital signal representative of the true static weight of the load.

It will be noted from above that one sample is completed when a fixed number of pulses P has been fed into the weighted counter 16, and so the time taken for one sample depends upon the repetition frequency of these pulses. Thus if the pulse rate is R pulses per second, the time taken for one sample is $P/R$ seconds, and the sampling rate, which is inversely proportional to the time taken for one sample, is $R/P$ samples per second. Therefore, in order to vary the sampling rate according to the desired multiplying function $f(t)$, it is necessary to vary the pulse rate into the weighted counter 16, and this is the function of the sampling frequency modulator 6.

An example of how the sampling rate can be varied in accordance with a function $f(t)$ is given in FIGURE 2. As can be seen, the sampling rate is varied in steps so that the result is only an approximation to $f(t)$. However, this is a very simple example, using only 32 samples and four different sampling rates viz. $R/P$, $2R/P$, $3R/P$ and $4R/P$, which has been chosen to facilitate the explanation of the operation of the sampling frequency modulator. In practice, a far greater number of samples are taken and a larger number of sampling rates may be used, so that a much closer approximation to $f(t)$ can be achieved.

FIGURE 3 shows the circuit for a sampling frequency modulator 6 which will produce the multiplying function shown in FIGURE 2. At the top of the diagram is the number of samples counter 18. This is a conventional binary counter, with reversing facilities, comprising four bi-stable elements denoted FF1, FF2, FF3, and FF4. The input pulses to counter 18 are the carry pulses from the weighted counter 16 (see FIGURE 1) and hence it progressively counts the number of samples. Beneath counter 18 are four AND gates A2, A5, A9 and A16. The function of gates A2, A5 and A9 is to recognise the counts on counter 18 at which it is desired to change the sampling rate. Thus gate A2 is arranged to give an output after two samples, gate A5 after five samples and gate A9 after nine samples. The fourth gate A16 is used to reverse counter 18 and a divider 19, the reason for this being explained later. The connections between counter 18 and the gates A2, A5, A9 and A16 are shown for A2 only, for the sake of clarity.

The pulses from the clock pulse generator 15 are fed to the divider 19, comprising three binary divide-by-two stages denoted FF8, FF9 and FF10. Thus, if the pulse rate from the clock pulse generator 15 is 8R, the pulse rate from the three stages is 4R, 2R and R respectively as shown. These pulses are fed to a common output line 20 via the gates G3, G4 and G5 and hence to the weighted counter 16. These gates are controlled by the reversible counter 21 comprising three bi-stable elements FF5, FF6 and FF7. Initially counter 21 is set to a count of one. This opens gate G5 and closes G3 and G4 so that the pulse rate fed into the weighted counter 16 is R. Two samples are taken with this pulse rate, the sampling rate being $R/P$. After two samples the AND gate A2 feeds a pulse via the OR gate 22 into counter 21, which registers a count of two. This opens gate G4 and closes gates G5 and G3, so that the output pulse rate is increased to 2R, the corresponding sampling rate being 2R/P, and three samples are taken at this sampling rate, bringing the total number of samples to five. Gate A5 then feeds a pulse into counter 21 which opens gate G4 and G5 and closes gate G3. This increases the sampling rate to 3R/P and four samples are taken at this rate. Then, after a total of nine samples gate A9 feeds a pulse into C2 which further increases the sampling rate 4R/P. Seven samples are taken at this rate bringing the total to sixteen, the time taken being T/2, half the weighing period. At this the AND gate A16 gives out a pulse which reverses the direction of counting on counters 18 and 21. A further seven samples are taken at the maximum sampling rate of 4R/P, after which the sampling rate is progressively reduced such that the multiplying function is symmetrical about time T/2. Thus the weighing cycle is completed after a time T when 32 samples have been taken. The end of the weighing cycle is indicated by a pulse from FF4 in counter 18, which is used to stop the clock pulse generator 15.

To adapt the modulator of FIG. 3 to multiply by the function $y=f(t)$ it is only necessary to extend the number of stages in each of the components circuits of FIG. 3.

I claim:

1. Dynamic weighing apparatus for weighing a moving load comprising at least one load sensing transducer for providing an electrical signal indicative of a load applied dynamically to said transducer, electrical circuit means connected to said transducer and including means for multiplying the electrical signal from said transducer by a predetermined function of time, which function is single valued at an instantaneous time, is positive throughout the weighing period, T and is substantially symmetrical about a maximum value of T/2, means for integrating the product signal from said multiplication with respect to time over the weighing period T, means for dividing the result of the integration by the integral of said function over the same period of time T and for producing a signal indicative of said division result representing the substantially true static weight of said dynamic load, and means for registering said division signal as an indication of said static weight.

2. Apparatus according to claim 1 comprising a delay circuit for initiating sampling of the transducer output a predetermined time following initiation of a weighing cycle by a load to be weighed.

3. Apparatus according to claim 1 comprising an analogue to digital converter connected to the transducer to change its output from analogue to digital form.

4. Apparatus according to claim 3 comprising a sample frequency modulator for effecting the multiplication by variation of the rate of sampling of the instantaneous digital information from the converter in accordance with said function.

5. Apparatus according to claim 4 comprising a serialiser connected to the sample frequency modulator and converter to provide a series of pulses representing the integrated product.

6. Apparatus according to claim 4 wherein the sample frequency modulator comprises a number of samples counter and a pulse rate divider.

7. Apparatus according to claim 6 wherein the pulse rate divider comprises a plurality of AND gates connected to a plurality of bistable stages of the number of samples counter so as to determine the sampling rates applicable to the numbers of samples taken in accordance with the function $y=f(t)$.

8. Apparatus according to claim 5 comprising a divider connected to the output of the serialiser to perform the division.

9. Apparatus according to claim 5 comprising a digital store having its output connected to the serialiser and a gate between the converter output and the store input, the gate being controlled by the sample frequency modulator to control the sampling of the converter by the store.

10. Apparatus according to claim 8, said registering means comprising an accumulator connected to the output of the divider.

11. Apparatus according to claim 9 comprising a clock pulse generator connected to feed pulses to the sample frequency modulator.

12. Apparatus according to claim 10 wherein the serialiser comprises a weighted counter having its input connected to the sample frequency modulator, and a plurality of pulse producing gates connected between the outputs of the store and weighted counter with the output of these gates feeding the divider.

13. An apparatus for weighing a moving load comprising a transducer for producing a signal representative of combined true static weight of said load and time varying components of a dynamic weight of said load, circuit means connected to said transducer and comprising first means for producing a first signal representative of the product of the value of the transducer signal and a predetermined function of time, said function being single valued at an instananeous time, positive throughout the weighing period T, and substantially symmetrical about a maximum value of T/2, second means for producing a second signal representative of the integral of said first signal integrated with respect to time over the weighing period T, means for producing a third signal representative of said second signal divided by the integral of said function over the same period of time T, said third signal representing the substantially true static weight of said load, and means for registering said third signal as an indication of said static weight.

References Cited

UNITED STATES PATENTS

| | | | |
|---|---|---|---|
| 2,752,092 | 6/1956 | McDonal | 235—183 |
| 2,840,707 | 6/1958 | Johnson | 328—151 |
| 2,936,951 | 5/1960 | Maher | 235—183 X |
| 3,043,516 | 7/1962 | Abbott et al. | 235—183 X |
| 3,105,197 | 9/1963 | Aiken | 328—151 X |
| 3,192,535 | 6/1965 | Watson | 177—1 |
| 3,276,525 | 10/1966 | Cass | 177—1 |
| 3,281,584 | 10/1966 | Martinez | 235—183 X |
| 3,307,019 | 2/1967 | Woodard et al. | 235—183 X |
| 3,334,306 | 8/1967 | Jensen | 328—151 |
| 3,342,984 | 9/1967 | Gray et al. | 235—183 X |

RICHARD B. WILKINSON, *Primary Examiner.*

G. H. MILLER, JR., *Assistant Examiner.*

U.S. Cl. X.R.

177—211; 328—151; 235—183